May 26, 1970     J. E. GARRETT ET AL     3,513,645
HAY CONDITIONER ROLL

Filed April 26, 1966     2 Sheets-Sheet 1

INVENTOR.
JOHN E. GARRETT
WILLIAM S. KORFF

BY J.B.Holden
ATTORNEY

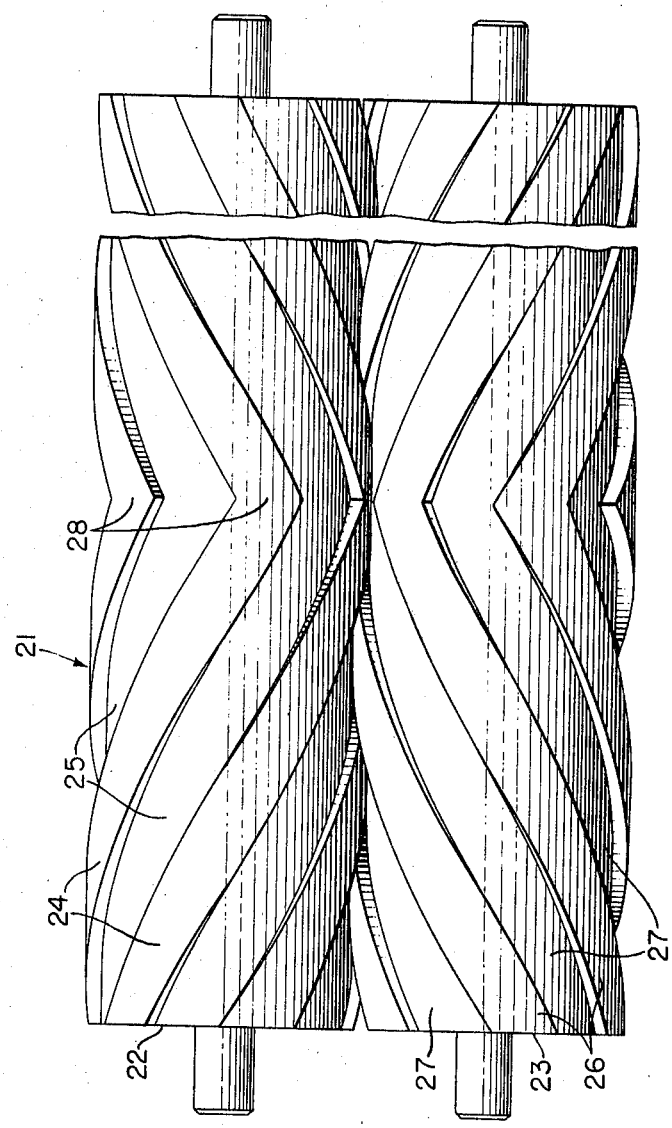

United States Patent Office 3,513,645
Patented May 26, 1970

3,513,645
HAY CONDITIONER ROLL
John E. Garrett and William S. Korff, St. Marys, Ohio, assignors, by mesne assignments, to Sperry Rand Corporation, New York, N.Y., a corporation of Delaware
Filed Apr. 26, 1966, Ser. No. 545,416
Int. Cl. A01d
U.S. Cl. 56—1                                              7 Claims This invention relates to a resilient roll for use in conjunction with one or more additional rolls of similar construction on hay conditioning machines.

The general construction and operation of hay conditioning machines is well described in Pat. No. 2,921,426 issued to S. C. Heth and will not be repeated herein since the invention claimed in the present application involves a roll structure for use in machines of the general type described in the Heth patent.

Various types of rolls have been on crop conditioning machines in the past. Most rolls were metal until recently when rubber rolls were devolepd. Some rolls have been of a unitary molded rubber construction and other have been segmented. Still others have been made from a series of discs cut from tire carcasses or similar material, assembled under high pressure on a shaft to form the roll. Rolls have been made with many types of surface configurations such as ribs, grooves, and other types of surface variations in an attempt to better perform the function of crimping and/or crushing hay or other similar crops passing between a pair of such rolls.

Many of the prior rib or groove configurations have not provided the proper conditioning of both the hay stalks and leaves that is necessary for uniform drying of the hay. Difficulty has also been encountered with breaking and distortion of the ribs on the rolls, particularly when stones and foreign objects are drawn through the rolls.

One important object of this invention is to provide a roll structure which uniformly crimps and crushes all parts of the hay or other crops being conditioned regardless of the stock diameter or leaf structure.

Another important object of the invention is to provide a more durable roll having a rib and grove configuration which is less subject to breakage and distortion.

In the drawings:

FIG. 5 is an elevational view of another embodiment of the invention.

Figure 1:
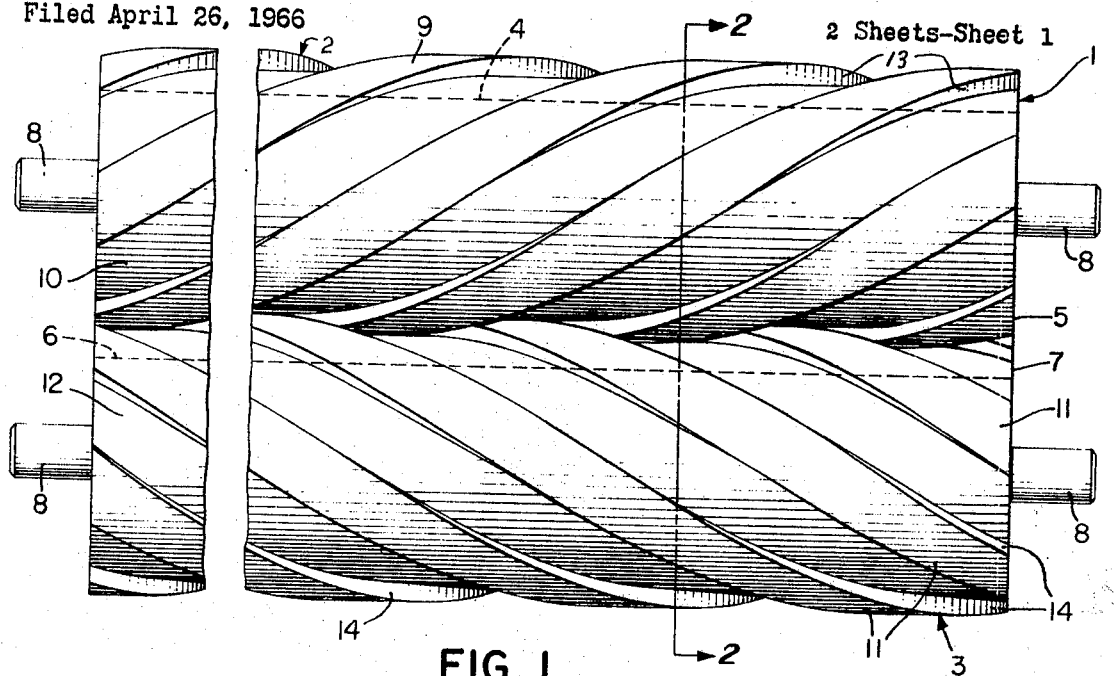
FIG. 1 is a side elevational view of a pair of intermeshing rolls constructed in accordance with the the invention.
Figure 2:
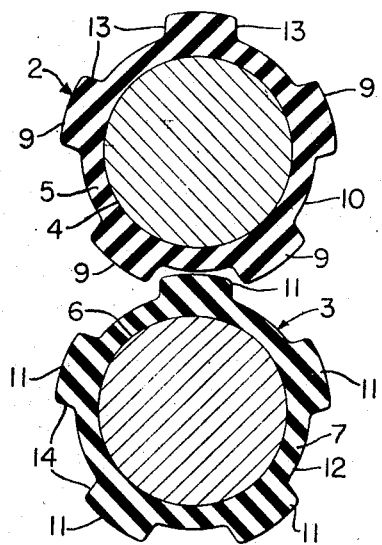
FIG. 2 is a cross-sectional view taken on line 2—2 of FIG. 1.

In FIGS. 1 and 2 a typical roll assembly 1 is illustrated in which a pair of intermeshing rolls 2 and 3 are positioned to rotate toward each other about parallel axes as indicated by the arrows in FIG. 2. A shaft or core 4 extends centrally through a tubular body portion or sleeve 5 of rubber or other suitable elastomeric material. In the same manner a shaft or core 6 extends centrally through a similar tubular body portion or sleeve 7. The cores 4 and 6 may be either bars or tubes and the sleeve 5 and 7 may be molded directly thereon or may be molded separately with longitudinal opening therethrough to receive the core. When the core is inserted in a separately molded sleeve, rotation of the sleeve with respect to the core, is prevented by bonding the sleeve and core together with a suitable adhesive or by keying the sleeve to the core as hereafter described and shown in FIGS. 3 and 4. The material from which sleeves 5 and 7 are formed preferably is reinforced with chopped fibers or other suitable materials for a more durable product as well as one which will better grip the crop to draw it between the rolls for conditioning. A coaxial cylindrical shaft extension 8 protrudes from each end of the cores 4 and 6 for journalling the rolls 2 and 3 on the frame or body of a crop conditioning machine (not shown).

The sleeve 5 of the rolls 2 has five equally spaced substantially identical integral ribs 9 extending helically around the periphery of the sleeve 5. The ribs 9 form five grooves 10 therebetween which follow the helical path of the ribs 9. Similarly, the roll 3 has five ribs 11 comparable to the ribs 9 on roll 2 but extending helically in the opposite direction and five grooves 12 between the ribs 11 with the same helical path of the ribs 12. As a result, ribs 9 and ribs 11 will intermesh when the two rolls 2 and 3 are rotated together after mounting in adjacent parallel relationship on a hay conditioning machine. The helical rib and groove pattern provides smoother operation of the rolls than a configuration of straight, longitudinal ribs and grooves.

An important feature of this invention is the particular rib and groove configuration used and the relationship therebetween when the two rolls are intermeshed to provide a more uniform crushing and crimping of all parts of the hay. The roll structure of this invention has a greater service life than many of the prior art devices, thus reducing maintenance and repair expense.

FIG. 2 shows the rolls 2 and 3 intermeshing relationship wherein one of the ribs 11 on the roll 3 extends into one of the grooves 10 on roll 2 and the top of the rib 11 contacts the bottom of the groove 10. Similarly, when the rolls 2 and 3 rotate to a position where one of the ribs 9 extends into one of the groove 12 of roll 3, the top of the rib 9 contacts the bottom of the groove 12.

The contact between the tops of the ribs 9 and 11 and the bottom of the grooves 10 and 12 respectively provides effective crushing of the hay in the area of contact and simultaneously grips the hay and pulls it through between the rotating rolls 2 and 3. The ribs 9 and 11 also serve as for blades which create a suction between the rolls 2 and 3 which aids in pulling the hay through. Each of the sides 13 and 14 on the ribs 9 and 11 respectively are substantially parallel to the opposite side of the same rib but are inclined at a radially outwardly diverging angle with respect to the nearest side of the adjacent rib. Also, each of the grooves 10 or 12 are wider than the ribs 9 or 11 to concentrate the crushing action solely between the top of the ribs and bottom of the grooves.

When the rolls 2 and 3 are in intermeshing relationship (see FIG. 2), the above mentioned inclination of the sides 13 and 14 and the relative width of the ribs 9 and 11 with respect to the width of the grooves result in a clearance between the sides of intermeshing ribs 9 and 11. This clearance permits uniform crimping of the hay as the hay passes over the corners of the ribs and also minimizes or eliminates any binding between the rolls of hay or other crops having large stocks such as maize, cane and the like. This clearance not only reduces the likelihood of rocks or other foreign objects being drawn into the rolls but also results in less likelihood of damage to the rolls if rocks do pass between them. To further increase the durability of the ribs 9 and 11, the width of each rib is greater than the height. This decreases the likelihood of pieces of the ribs being broken or torn off during use. In addition to the above advantages of this rib and groove configuration, hay passing between the rolls is fluffed in a manner that will provide increased air circulation for faster drying of the crop.

Figure 3:
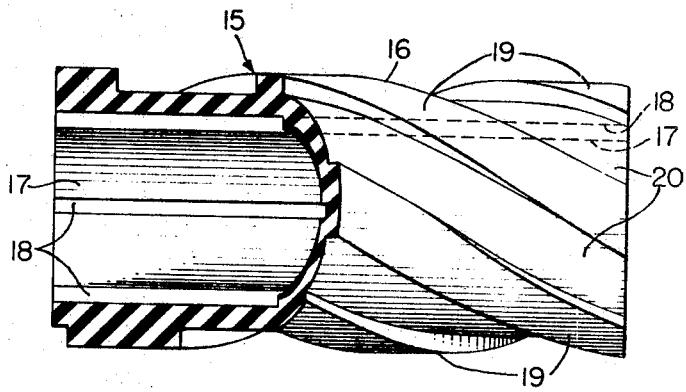
FIG. 3 is a partially broken-away side elevational view of another embodiment of the invention.
Figure 4:
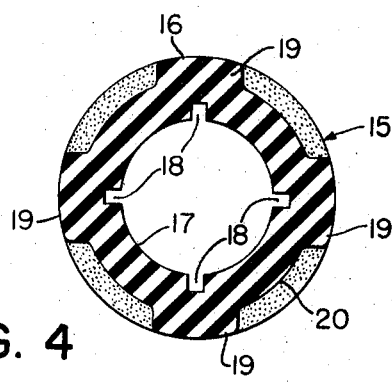
FIG. 4 is an end view of the embodiment shown in FIG. 3.

Referring now to FIGS. 3 and 4 a roll 15 consists of an elongated elastomeric tubular sleeve 16 having a central longitudinal opening 17 therethrough for receiving a keyed shaft (not shown). Extending longitudinally through the central opening 17 are four keyways 18 located 90° from each other around the inner circumference of the opening 17. The sleeve 16 has extending helically around its outer periphery four ribs 19 which form four grooves 20 therebetween. The roll configuration shown in FIG. 3 may be used in conjunction with a mating roll (not shown) having ribs similar to the ribs 19 but extending helically in the opposite direction to permit intermeshing of the ribs on the two rolls in the same manner as rolls 2 and 3 in FIGS. 1 and 2.

An additional embodiment of the invention is illustrated by FIG. 5 wherein roll assembly 21 is similar to roll assembly 1 (FIGS. 1 and 2) except that the rolls 22 and 23 of roll assembly 21 have a different rib and groove pattern. The ribs 24 forming grooves 25 therebetween on roll 22 and the ribs 26 forming grooves 27 on roll 23 are arranged in a "herringbone" or "chevron" pattern around the periphery of the rolls instead of the continuous helical rib and groove pattern used on rolls 2 and 3 of FIG. 1.

The right end of rolls 22 and 23 in FIG. 5 has a helical rib and groove pattern around the periphery thereof which is substantially the same as that of the right end of rolls 2 and 3 in FIG. 1. The left end of rolls 22 and 23 has a helical rib and groove pattern of opposite curvature to the right end thereof. The right segment of each of the ribs 24 and grooves 25 integrally joins with the left segment thereof at a predetermined juncture location 28 along the axial length of the roller 22 and forms a V or chevron pattern at the juncture 28 of the two segments due to the reverse in the helix angle of the ribs and grooves.

Similarly the right segment of ribs 26 and grooves 27 integrally joins with the left segment thereof and forms a chevron pattern on roller 23 which intermeshes with the chevron pattern on the roller 22.

As a further embodiment of the invention the curvature of the helical ribs and grooves may reverse more than once throughout the length of the roller thereby providing an additional chevron pattern each time the helix direction reverses.

One of the primary advantages of reversing the helical pattern at least once throughout the length of the roller is that it prevents lateral movement of the crop passing between the rollers which sometimes occurs when a continuous helical pattern is used.

The previous description of the structural configuration of the ribs 2 and 3, the clearances between the ribs, and the manner in which the ribs intermesh is equally applicable to a pair of rolls of the type shown in FIGS. 3, 4 and 5 or to other similar types of rolls having a different number of ribs.

Although for the purpose of illustrating the invention rolls having five ribs and another roll having four ribs have been shown, it will be obvious that the number of ribs which may be used is limited only by the available space around the circumference of the roll as well as the extent of crushing desired. It is also obvious that the rubber sleeve portion of the roll may be cast in place on a central shaft or core or may be cast separately with keyways therein and later inserted upon a keyed shaft or roll. The sleeve portions of the various roll embodiments of this invention may be molded in one piece or may be molded in separate segments which are later assembled in end-to-end abutting relationship on a center core or shaft.

Various other changes can be made in the illustrative embodiments shown herein without departing from the scope of the invention.

What is claimed is:

1. A roll assembly for use on a hay conditioning machine comprising:
    (A) a pair of intermeshing rolls disposed in adjacent parallel relationship, each of said rolls comprising,
        (1) an elongated cylindrical elastomeric body portion; and
        (2) a plurality of substantially identical integral radially outwardly extending ribs equally spaced and extending around the periphery of said body portion, said ribs forming a plurality of chevron shaped members thereon with a grove of similar contour between each adjacent pair of ribs;
        (3) the opposite sides of each rib being substantially parallel but inclined at a radially outwardly diverging angle with respect to the nearest side of the adjacent rib;
        (4) the chevron pattern of the ribs and grooves of one roll being of opposite contour to those of the other roll of said pair, to permit continuous intermeshing of the ribs and grooves of one roll with those of the other as the rolls rotate wherein the ribs of each roll extend into the grooves of the other roll to simultaneously crush and crimp hay passing therebetween.

2. The roll assembly of claim 1 in which the width of each rib is substantially greater than the height thereof.

3. The roll assembly of claim 2 in which the top of each rib contacts the bottom of one of the grooves in the opposite roll once during each complete revolution of the rollers.

4. The roll assembly of claim 3 in which the elastomeric body portion of each roll is molded on an axial core.

5. The roll assembly of claim 3 in which the elastomeric body portion of each roll is molded with an axial opening therethrough, with a radially inwardly facing keyway in the opening for receiving a keyed center core therein.

6. The roll assembly of claim 3 in which the body portion of each roll is molded in a plurality of separate segments and assembled in abutting end to end relationship on an axial center core.

7. The roll assembly of claim 1 in which each rib forms one chevron-shaped member.

References Cited

UNITED STATES PATENTS

| | | |
|---|---|---|
| 2,535,485 | 12/1950 | Cover. |
| 2,811,819 | 11/1957 | Heth. |
| 3,085,384 | 4/1963 | Adee et al. |
| 3,111,742 | 11/1963 | Lakin. |

ANTONIO F. GUIDA, Primary Examiner